Oct. 31, 1961   H. W. DOANE   3,006,519
VEHICLE LOAD CARRYING ATTACHMENT
Filed Jan. 22, 1959   2 Sheets-Sheet 1
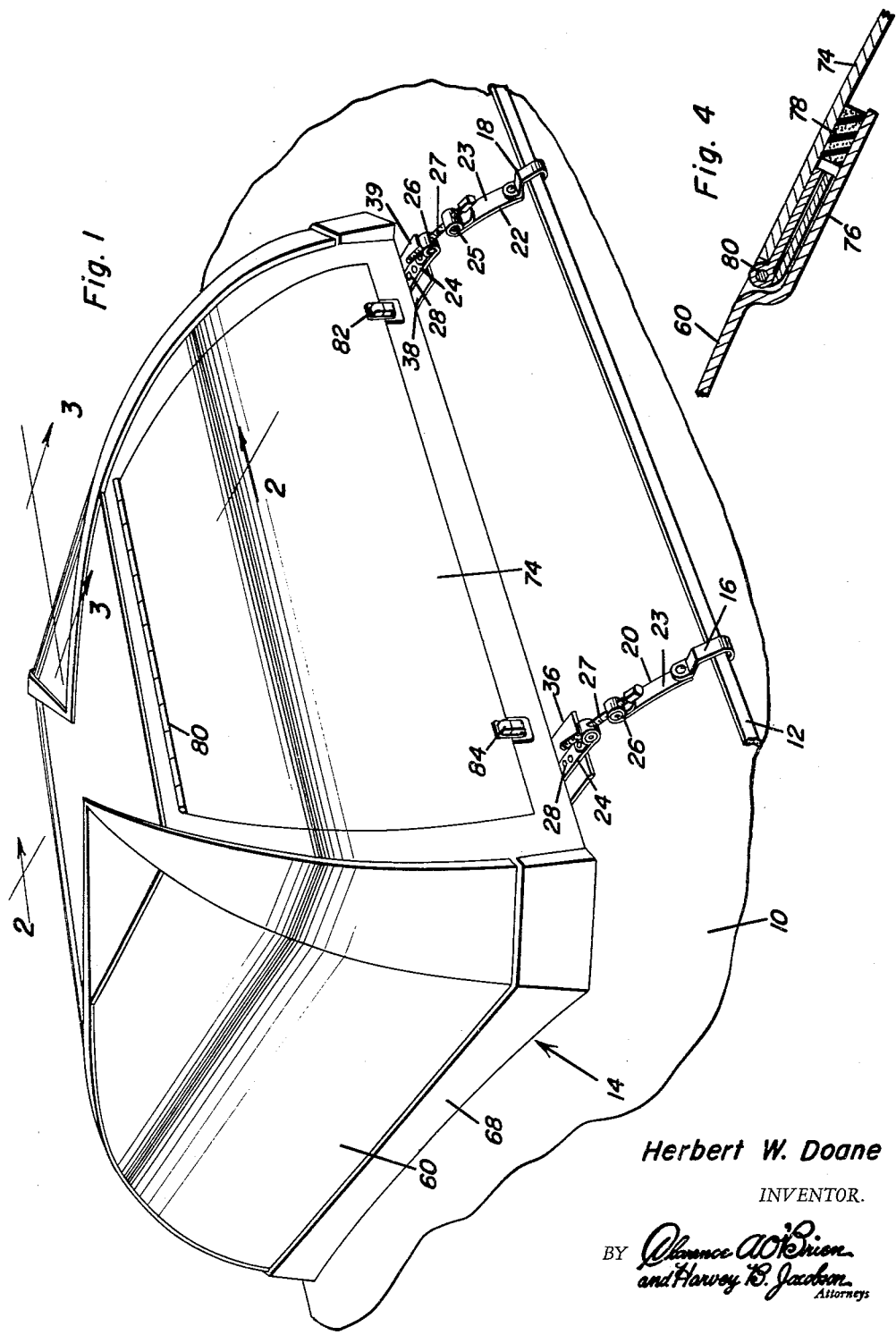
Herbert W. Doane
INVENTOR.

Oct. 31, 1961 H. W. DOANE 3,006,519
VEHICLE LOAD CARRYING ATTACHMENT
Filed Jan. 22, 1959 2 Sheets-Sheet 2
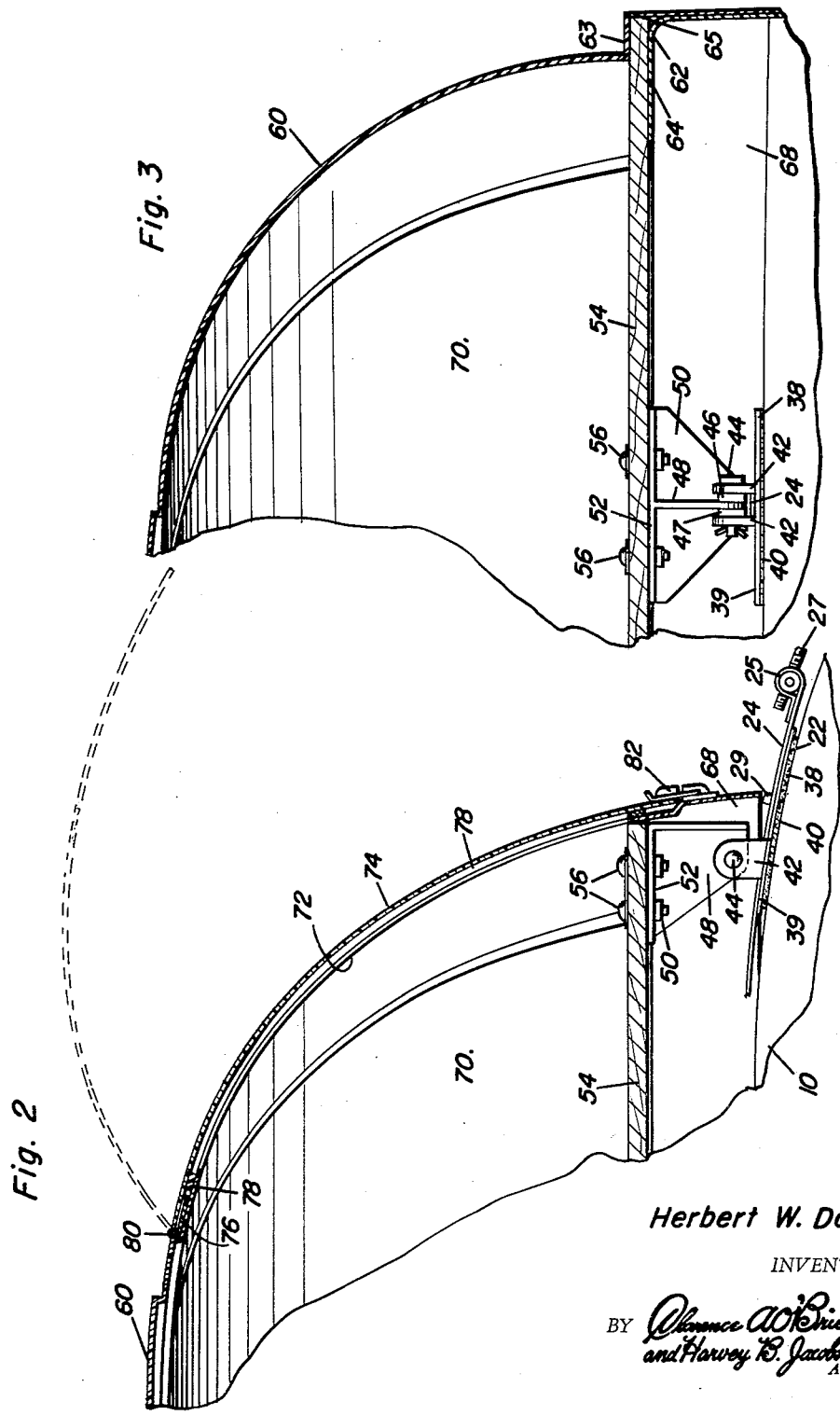
Herbert W. Doane
INVENTOR.
BY Clarence A. O'Brien
and Harvey B. Jackson
Attorneys 3,006,519
VEHICLE LOAD CARRYING ATTACHMENT
Herbert W. Doane, Yakima, Wash., assignor to Sun
Manufacturing Company, a corporation of Washington
Filed Jan. 22, 1959, Ser. No. 788,331
6 Claims. (Cl. 224—42.1)

This invention relates to attachments for motor vehicles and more particularly to a carrier for the top of a conventional motor vehicle.

An object of the invention is to provide an enclosed, waterproof, dustproof container to be fastened to the top of a motor vehicle and within which various articles may be stored and transported therein.

Previous carriers have been open supports, and when protection from the weather is desired by the motorist, he generally covered the luggage or other articles on the carrier with a canvas or some other type of flexible cover. The present invention provides an enclosure of substantial material, for instance lightweight metal or plastic, forming a rigid wall and top to assure protection for the contents of the carrier. There is a door in the carrier for access to the interior thereof. Not only are the articles which are disposed in the carrier protected from the weather, but the carrier is considerably more attractive than ordinary carriers which are commonly found on motor vehicles at the present time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a carrier constructed in accordance with the invention, a fragment of a motor vehicle being illustrated to show the preferred position of the carrier on a motor vehicle.

FIGURE 2 is a sectional view taken on the line 2—2 of FIGURE 1.

FIGURE 3 is a sectional view taken on the line 3—3 of FIGURE 1.

FIGURE 4 is an enlarged fragmentary detail of the hinge for the door of the carrier.

In the drawings part of the top 10 of a motor vehicle is shown with conventional rain gutter 12, usually located near the edge of the roof line. Carrier 14 is disposed on roof 10 and held in place by four hooks, each of which is identical. Hooks 16 and 18 are typical, and they are attached to the ends of flexible, adjustable straps 20 and 22. The adjustment may be made by a conventional buckle connected with the straps. However, it is preferred that each strap be composed of two flat metal strap sections 23 and 24 with the outer end of section 23 riveted or otherwise secured to one of the hooks. The confronting ends of sections 23 and 24 are looped around cylindrical nuts 25 and 26 and have aligned apertures through which adjusting bolt 27 is passed. Section 24 has a group of apertures 28, a selected aperture of which has lug 29 passed therethrough.

There are two supports 36 and 38 extending laterally outwardly from each side of the carrier 14. Typical support 38 (FIGURE 2) is made of a plate 39 having a slight curvature. Lug 29 is fixed to the top surface of plate 39. The curvature of the plate 39 approximately follows the curvature of the roof 10, and it has a pliant, flexible pad 40 on its undersurface, cemented or otherwise held in place. The pad not only guards against marring the finish of the roof of the motor vehicle but it also yields to more or less account for slightly different curvatures of roof tops in different manufacturer's makes of motor vehicles.

There are a pair of spaced ears 42 secured to the top surface of support 38 and having a pair of aligned apertures through which pivot pin 44 passes. The ears are spaced to receive strap sections 24 between them. The pivot pin also passes through a pair of spacers 46 and 47 (FIGURE 3) and through an opening in plate 48 of mounting bracket 50. The mounting bracket then, is articulated in that it is capable of tilting about the longitudinal axis of pin 44 and the supports 36 and 38 are symmetrically arranged on the carrier 14 whereby the carrier 14 will be self-levelling when disposed on a symmetrical vehicle top. Upper plate 52 of mounting bracket 50 has a floor panel 54 riveted, bolted as at 56 or otherwise secured to it. This supports the floor at a slight elevation above the roof top of the motor vehcile.

Enclosure 60 is attached to floor 54 and is approximately shaped to resemble an ornamented dome, although the ornamentation may be widely varied. By having the enclosure constructed of curved panels joined together at edges, considerable rigidity is achieved. Accordingly, the several side walls of the enclosure are constructed in this way. In instances wherein the enclosure is made of a plastic laminate, an inwardly directed channel 62 (FIGURE 3) may be molded so that there is an upper wall 63, a bottom wall 64 of considerable width, and an end wall 65 to form an inwardly opening pocket within which the edge portions of the floor panel 54 are received. This would be all that is necessary to hold the enclosure 60 attached to the floor panel 54, although additional fasteners may be used. Further, when constructed of plastic by the laminate, molding technique, a skirt 68 may extend from the juncture of walls 64 and 65 to form a neat enclosure which depends below the surface of floor panel 54 and terminates close to the roof 10. This not only lends to the neatness of the carrier but also functions as a weatherseal, keeping the great majority of the water, dust, dirt, etc. from entering the compartment 70 enclosed by enclosure 60 and floor panel 54.

There is an opening 72 in one wall of the enclosure, and a door 74 to cover that opening. The door fits in a recessed door frame 76 made integral with the enclosure wall and overlies the door frame for producing a more effective weatherseal. A compressible gasket 78 is cemented or otherwise secured to the door frame or to the door and fits between the frame and the door. Piano hinge 80 is attached to the upper edge of the door and is inset in frame 76 hingedly mounting the door from its upper edge so that it may be swung open in an upward direction. The tendency of the door, then, is to be gravity lowered to the closed position. The door is maintained tightly closed by a pair of trunk latches 82 and 84 that are attached to the door and a part of the skirt 68 beneath door opening 72.

In use and operation, the carrier is installed on the roof of a motor vehicle by engaging the hooks 16, 18 and the two hooks on the other side of the carrier with the gutter 12. This is all that is necessary to install the carrier, the supports 38 automatically coming surface-to-surface contact with the top surface of the roof, and the floor panel 54 being self-levelling due to its articulated connection with the supports. The door 74 may then be unlatched and opened so that various articles may be inserted in compartment 70. After loading the carrier, the door 74 is latched and sealed by the action of gasket 78. Accordingly, all articles stored in the compartment 70 are maintained clean and dry without the necessity of makeshift or improvised coverings for articles as is a common occurrence at the present time.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A carrier for a generally symmetrical car top comprising an enclosure including a floor and a skirt depending below said floor, symmetrically arranged supporting means for the enclosure comprising elongated plates extending out of said skirt beneath the same transversely thereof to expose the plates outwardly of the skirt, brackets fixed to and depending from said floor over said plates and within the skirt, pairs of upstanding lugs on said plates within the skirt straddling and pivoted to said brackets to space the skirt above the plates and form with the plates articulated joints for pivoting said plates about axes extending transversely of said plates and supporting said floor for self-leveling on a car top, with the joints concealed by said skirt, and hook means swiveled on said plates outwardly of the skirt for easy access thereto and attachable to side gutters of a car top.

2. A carrier adapted to overlie and to be supported by a generally symmetrical motor vehicle top, said carrier comprising a panel-like floor, at least three depending supports carried by said floor and adapted to engage the upper surfaces of the vehicle top to support said floor a spaced distance thereabove, said floor having peripheral edges and said supports each being positioned adjacent one of said peripheral edges, said supports each including a slightly curved support plate adapted to conform to a portion of the upper surfaces of the vehicle top, articulated means pivotally securing each of said support plates to the lower end of its support for movement about a horizontal axis extending transversely of said plate, said supports being symmetrically arranged on said floor, securing means for securing said supports to an adjacent portion of a vehicle top, each of said plates being elongated and secured to its respective support adjacent one end with the other end of each plate projecting outwardly beyond the adjacent edge of said floor, said last mentioned securing means comprising elongated tension means carried by the other ends of said plates and adapted for engagement with portions of a vehicle beyond said other ends of said plates.

3. The combination of claim 2 including an enclosure having side walls, means securing said enclosure to the peripheral edges of said floor, the lower edges of said side walls projecting below said floor to constitute a weather shield below said floor and above the top of the vehicle to which the carrier is secured, the lower edges of said side walls terminating at a point spaced slightly above the upper surfaces of said plates.

4. The combination of claim 3 including an opening formed in a side wall of said enclosure, a door attached to said enclosure and overlying said opening, and at least one latch connected with said door and a part of said enclosure to retain said door in a closed position overlying said opening.

5. The combination of claim 2 wherein each of said tension means includes a tension member adjustable in length having means on one end adapted for engagement with a portion of the vehicle adjacent the edges of its tops and means on the other end for adjusted engagement with said other end of the associated support plate.

6. The combination of claim 5 including upwardly projecting lugs on said other ends of said plates, each of said adjustable engagement means including an elongated strap, a plurality of longitudinally spaced apertures formed through said strap selectively engageable with the associated lug.

References Cited in the file of this patent

UNITED STATES PATENTS

| | | |
|---|---|---|
| 1,804,868 | Gage | May 12, 1931 |
| 2,222,636 | Strauss | Nov. 26, 1940 |
| 2,597,656 | Martin | May 20, 1952 |
| 2,643,040 | Hare | June 23, 1953 |
| 2,683,265 | Wayne | July 13, 1954 |
| 2,684,796 | Swenson | July 27, 1954 |
| 2,775,381 | Hare | Dec. 25, 1956 |
| 2,788,929 | Gallagher | Apr. 16, 1957 |
| 2,812,992 | Lysen | Nov. 12, 1957 |

FOREIGN PATENTS

| | | |
|---|---|---|
| 364,267 | Italy | Oct. 26, 1938 |
| 853,371 | France | Dec. 7, 1939 |
| 497,112 | Canada | Oct. 27, 1953 |